June 10, 1947.  D. G. C. LUCK  2,422,025
NAVIGATIONAL POSITION PLOTTING
Filed Nov. 30, 1942  2 Sheets-Sheet 1
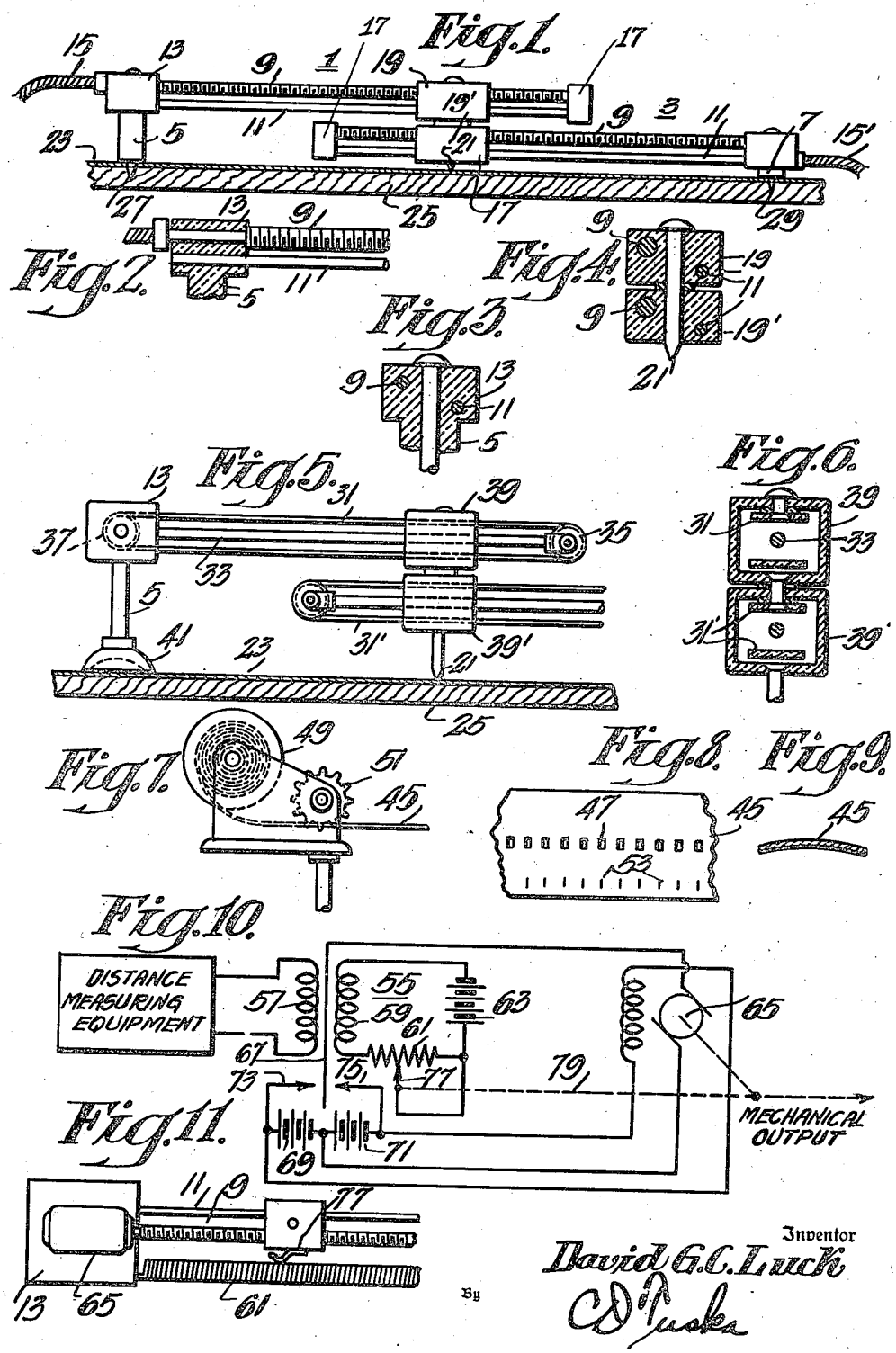
Inventor
David G. C. Luck June 10, 1947.   D. G. C. LUCK   2,422,025
NAVIGATIONAL POSITION PLOTTING
Filed Nov. 30, 1942   2 Sheets-Sheet 2

Inventor
David G. C. Luck
Attorney

Patented June 10, 1947

2,422,025

UNITED STATES PATENT OFFICE 2,422,025

NAVIGATIONAL POSITION PLOTTING

David G. C. Luck, Hightstown, N. J., assignor to Radio Corporation of America, a corporation of Delaware Application November 30, 1942, Serial No. 467,444

10 Claims. (Cl. 250—11)

This invention relates to position plotting mechanisms and more particularly to mechanical systems for indicating automatically on a map the position and/or course of a mobile craft by means of distance measurements based on the time required for signals to travel between said mobile craft and fixed reference stations.

Various systems have been devised for measuring the distance between two stations by radiating a signal from one to the other, and using the signal received at the second station to control a transmitter at the second station to radiate a similar signal back to the first station. The received retransmitted signal is compared in phase or in frequency with the initial signal to provide an indication of the time required for a signal to travel between the two stations. The signals used may be timed pulses of radiant energy or sound or supersonic waves, or frequency modulated waves. Two or more reference stations may be used and the position of the mobile station determined by triangulation. Under certain circumstances it may be desirable to avoid transmissions from the mobile station. This may be done by using three or more fixed stations, interconnected by transmission lines or other synchronizing means so as to transmit in timed relationship. These signals are compared at the mobile station, giving information in the form of the differences in the travel times from the several fixed stations to the mobile station.

Although accurate indications of the distances or distance differences from a mobile craft to fixed reference stations are of great value in the navigation of aircraft and the like, the necessary operations of plotting or calculating in order to determine the map position of the mobile station are time-consuming and frequently very involved. In the case of rapidly moving aircraft, particularly when the duties of navigation fall on personnel which is otherwise occupied, it is not feasible to maintain a constant check on the course or position of the craft by such means.

Accordingly, it is the principal object of the present invention to provide an improved method of and means for computing and indicating the position of a mobile station in response to radiation travel time measurements of the type described.

Another object is to provide an improved system for performing said operations automatically and continuously.

Figure 12:
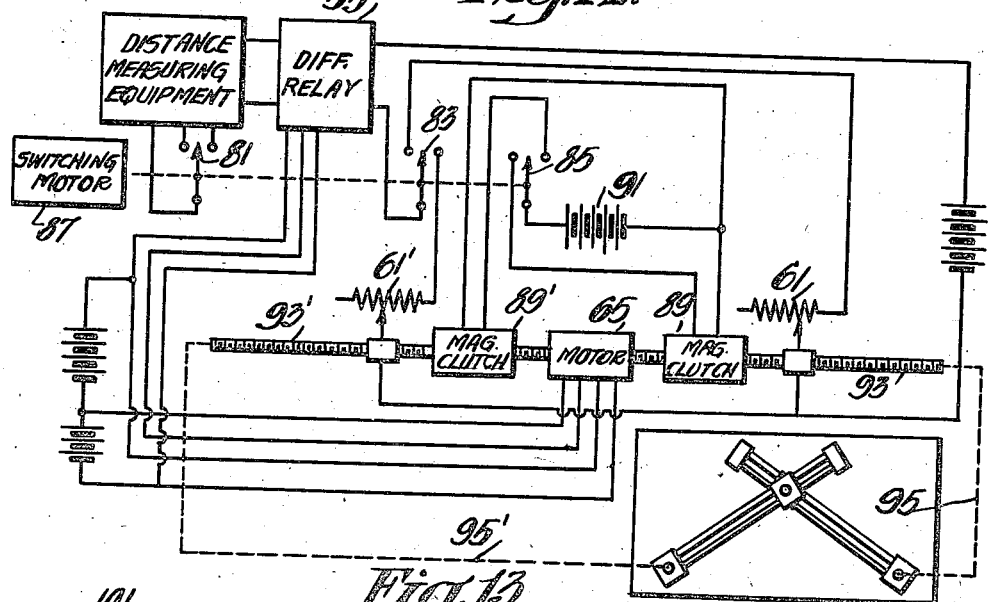
Figure 13:
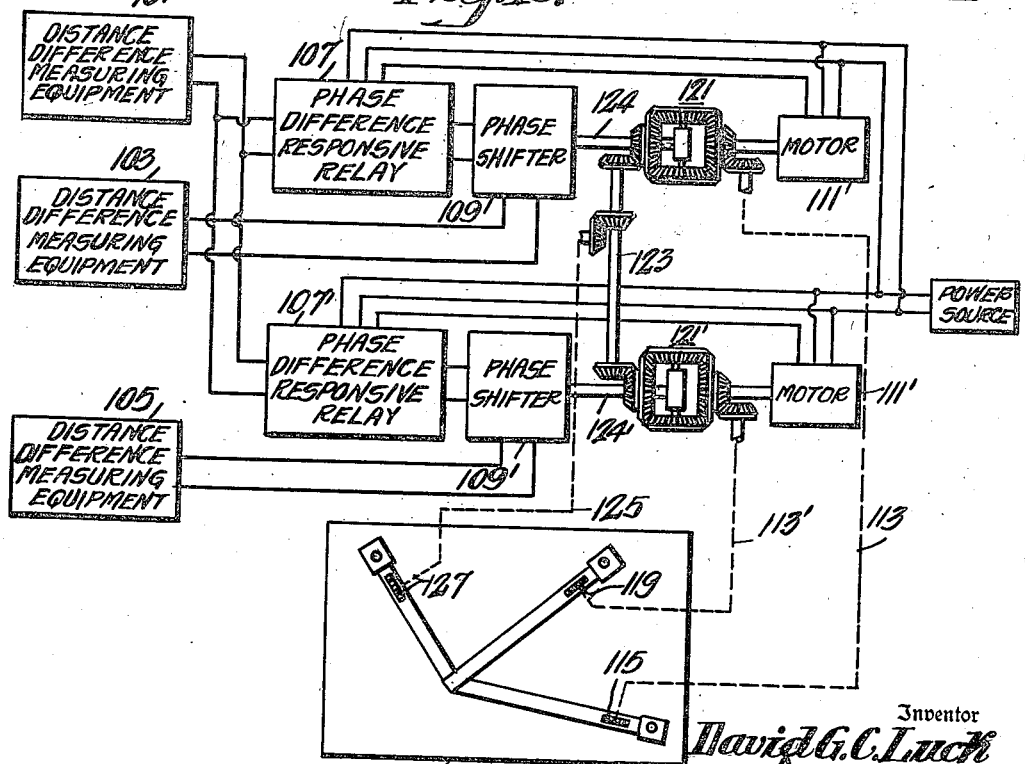

These and other and incidental objects will become apparent to those skilled in the art upon consideration of the following description, with reference to the accompanying drawings of which Fig. 1 is an elevational view of the plotting mechanism of one embodiment of the invention. Figs. 2, 3 and 4 are sectional views of the device of Fig. 1. Figs. 5 and 6 are elevational and sectional views respectively of a modification of the structure of Fig. 1. Figs. 7, 8 and 9 are elevational, plan and sectional views respectively of modified elements of the invention; Fig. 10 is a schematic diagram of a servo system, Fig. 11 is a plan view of a structural combination of the system of Fig. 10 with that of Fig. 1, Fig. 12 is a schematic diagram of a complete position plotting system employing travel time measuring equipment, and Fig. 13 is a schematic diagram of a plotting system arranged to employ travel time difference measuring equipment. Similar reference characters indicate similar elements in the drawings.

Referring to Fig. 1, a pair of radial members 1 and 3 are provided with pivotal supports 5 and 7 respectively. Each of the members 1 and 3 includes a lead screw 9 and a guide rod 11 supported in a block 13. The lead screw 9 is connected to a flexible shaft 15. The outer end of the screw 9 is supported in a block 17 carried at the end of the rod 11. A carriage 19, more clearly shown in the sectional view of Fig. 4, is slidably supported on the rod 11 and engages the screw 9 so as to be moved longitudinally thereof upon rotation of the flexible shaft 15. A second carriage 19' is provided on the member 3 and pivotally connected to the carriage 19. A stylus 21 is provided on the carriage 19' to engage a surface of a map 23 placed on a supporting board 25. The arrangement of this equipment is shown in plan view in Fig. 11. The supports 5 and 7 are provided with push pins 27 and 29 which may be forced through the map 23 at points corresponding to the positions of the reference stations.

In operation, the shaft 15 is rotated so as to move the carriage 19 to a point along the member which corresponds to the distance of the mobile station from the respective reference station. The shaft 15' is rotated to move the carriage 19' to a point on the support 3 corresponding to the map distance of the mobile station from the second reference station. The radial members 1 and 3 are free to swing about the supports 5 and 7, while the carriages 19 and 19' are constrained by their pivotal connection to a common position with reference to the map 23. Thus the stylus 21 is moved to a position on the map corresponding to that of the mobile station.

The modified structure illustrated in Figs. 5 and 6 employs endless belts 31 and 31' instead of the lead screw of Fig. 1. A supporting rod 33 is secured at one end to the pivoted block 13 and carries at its outer end a pulley 35. A second pulley 37 is provided in the block 13 and connected to the flexible shaft or similar driving means, not shown. A pair of carriages 39 and 39' are connected to the belts 31 and 31' as shown in Fig. 6 and pivotally connected together. The stylus 21 is secured to the lower carriage 39'. The supporting member 5 may be provided with a suction cup 41 adapted to engage the map 23. The operation of the structure of Fig. 5 is similar to that of system of Fig. 1.

A third modification is illustrated in Figs. 7, 8 and 9. A form stiffened tape 45, which may be made of transparent plastic material, is provided with sprocket holes 47 similar to those used in commercial moving picture films. The tape is slightly dished to provide stiffness, as shown by the section of Fig. 9, in a manner similar to that of an ordinary flexible steel tape measure. A storage reel 49 is substituted for the blocks 13 of the system shown in Figs. 1 and 5, and a sprocket wheel 51 is provided for driving the tape 45. Two or more such arrangements are provided, with the outer ends of the tape pivotally secured together by a hollow rivet or equivalent means. The respective sprockets 51 are rotated to drive the common pivot point radially from the map positions of the respective reference stations to a point corresponding to the position of the mobile station. The tape 45 may be provided with a suitable scale 53 adapted to be read against an index to indicate the respective distances of the reference stations.

Although it is contemplated that the above described system may be operated by hand, it may be desirable to provide completely automatic operation, dispensing with the necessity for manually setting in the values of the various distances. Fig. 10 illustrates an arrangement for rotating a shaft through an angle corresponding to the output of a distance measuring device. In this instance it is assumed that the distance measuring equipment provides a unidirectional voltage proportional in magnitude to the distance of the particular reference station from the mobile station. A differential relay 55 is provided with one actuating coil 57 connected to the distance measuring device and an opposed coil 59 connected through a rheostat 61 to a D.-C. source 63. A D.-C. motor 65 is connected to the movable contact 67 of the relay 55 and to a pair of serially connected sources 69 and 71. The outer terminals of the sources 69 to 71 are connected to the stationary contacts 73 and 75 of the relay 55. The movable arm 77 of the rheostat 61 is mechanically connected, as indicated by the dashed line 79, to the shaft of the motor 65. In operation, the motor 65 runs in the one direction or the other depending on the position of the movable contact 67 of the relay 55, to adjust the rheostat 61 so that the energization of the winding 59 is equal to that of the winding 57. When the output of the distance measuring device changes, the relay 59 is actuated, causing the motor to rotate and readjust the rheostat 61 to a new position corresponding to the new distance. Suitable antihunting means of any well known type may be provided to prevent sustained oscillation of the motor 65. Thus the angular position of the shaft 79 is maintained in correspondence with the measured distance. A separate follow-up system may be connected between each distance measuring device and the corresponding radially movable member of the plotting device. The rheostat 61 may be linear in form, if desired, and supported along the arm member. The motor 65 may be supported on the block 13. This arrangement is illustrated in Fig. 11.

It is also possible to multiplex the operation of the distance measuring equipment and the follow-up system, as shown in Fig. 12. Double throw switches 81, 83 and 85 are ganged together and are connected to a switching motor 87 which is arranged to operate cyclically the switches from one position to the other at a suitable slow rate. The switch 81 is connected to the distance measuring device so as to change the tuning thereof or otherwise cause said device to cooperate alternately with different reference stations. The switch 83 is connected between the differential relay 55 and rheostats 61 and 61', which are connected like the rheostat 61 in the system of Fig. 10. A pair of magnetic clutches 89 and 89' are connected between the motor 65 and the movable arms of the rheostats 61 and 61'. The switch 85 is connected between the clutches 89 and 89' and a D.-C. source 91. The output shafts 93 and 93' of the clutches 89 and 89' are connected to the respective radial driving members of the plotting mechanism, as illustrated schematically by the dashed lines 95 and 95'. In operation, the distance measuring device and differential relay are alternately connected to cause the motor 65 to adjust the rheostats 61 and 61' to positions corresponding to the distances of the respective reference stations from the mobile station. The rotation of the shafts 93 and 93' operates the plotting mechanism in the same manner as described above.

When the information is presented by the measuring equipment in terms of travel time differences or distance differences, instead of the distances themselves, a somewhat different organization is required. At least three radial members are necessary to utilize the two differences which are required for a solution of plotting problems. Each pair of radial drives is interconnected through differential means such as ordinary differential gearing. Indicator means may be connected to the differential spider elements, and the radial members adjusted simultaneously to cause the indicators to move to positions corresponding to the distance differences. When these indications are secured, the radial members will be extended to lengths corresponding to the respective distances, and their intersection will be on the map position of the mobile station as in the above described system. In the case of a manually operated system it may be desirable to set in the distance differences directly through the differential spiders rather than adjust the radial lengths to produce the differential indications.

Fig. 13 shows an automatic plotting system with distance difference measuring equipment. In this case it is assumed that the output of the devices 101, 103 and 105 are in the form of synchronized wave trains, differing in phase with each other according to the difference in the distances of the respective reference stations from the mobile station. The device 101 is connected to a phase difference responsive relay 107. The device 103 is connected through an adjustable phase shifter 109 to the second input circuit of the phase responsive device 107. A second phase difference responsive relay 107' is connected to the device 101, and through a phase shifter 109' to the device 105. A reversible motor 111 is electrically connected to the output of the relay 107 and is mechanically connected, as schematically indicated by the dashed line 113 to the radial drive member 115 of a plotting mechanism 117. A second motor 111' is electrically connected to the relay 107' and is mechanically connected as schematically indicated by the dashed line 113' to the radial drive 119. The shaft of the motor 111 and a shaft 123 are connected through a differential 121 to the control shaft 124 of the phase shifter 109. The motor 111' and the shaft 123 are similarly connected through a differential 121' to the phase shifter 109'. The spider elements of the differentials are connected to the phase shifters. The shaft 123 is mechanically connected as schematically indicated by the dashed line 125 to the third radial drive 127 of the plotting mechanism 117. The various gear ratios are so determined that the motion of the arms of the plotting mechanism correspond directly on the scale of the map, to the actual motion of the mobile craft. The mechanical connections 113, 113' and 125 may comprise flexible shafts, Selsyn systems or any known means for transferring motions.

In operation, the motor 111 is energized through the relay 107 so as to drive the phase shifter 109 to such a position that the two inputs to the relay 107 bear a predetermined phase relationship to each other, as for example 90°. The position to which the phase shifter 109 must be driven thus depends on the difference in phase between the outputs of the radio devices 101 and 103. The position to which the shaft of the motor 111 must be rotated depends not only upon the position to which the phase shifter 109 must be driven, but also upon the angular position of the shaft 123. The motor 111' is similarly energized through the relay 107' to drive the phase shifter 109'. Both of the motors 111 and 111' operate simultaneously to control the phase shifters, and through the phase shifters, each other, driving the radial members 115 and 119 until the relays 107 and 107' are both balanced. Under these conditions, the differences in the radial extensions of the respective plotting arms are proportional to the differences in the distances of the reference stations from the mobile station, and the radial extensions are similarly proportional to the respective distances themselves, providing an indication of the position of the mobile station similar to that produced by the system of Fig. 11. It should be noted that each of the above described automatic plotting systems is subject to binding under certain conditions due to over constraint of the mechanical linkages. Thus in the system of Fig. 13, if the position of the mobile craft falls on the line between the two reference stations corresponding to the radial drive members 115 and 119, the point of the intersection of the plotting arms can not be moved out of this line by any operation of the motors 111 and 111'. For this reason it is essential that the system be employed only when the mobile station does not lie in a line between the reference stations, or that some means be provided for temporarily releasing the drives to the plotting mechanism to restore the normal freedom of operation.

Thus the invention has been described as an improved system for automatically plotting the position of the mobile craft upon a map in response to radio measurements of the distances of said craft from a plurality of reference stations. Radially extensible arms are pivoted at points corresponding to the map positions of the reference stations and pivotally inter-connected at points which correspond in their radial distances along the arms to the measured distances. A modified system is described for use with time travel difference measuring devices, including differential means interconnecting the radially adjustable plotting arms.

I claim as my invention:

1. A system for plotting the position of a mobile craft upon a map, comprising a plurality of arm members pivoted at points corresponding to the map positions of respective reference stations, carriage members supported on said arms for movement longitudinally thereof, all of said carriages being pivotally connected together, and means for moving each of said carriages to a position along its respective supporting arm corresponding to the map distance of said mobile station from the respective reference station.

2. A position plotting mechanism comprising a plurality of arm members intersecting at a common point and pivotally connected together at said point, each of said members being pivoted separately at a point corresponding to the map position of a respective reference station, and means connected to each of said arms for adjusting the distance of said common pivot point along said arms from said respective reference pivot point to a value corresponding to the distance of said mobile station from the corresponding reference station.

3. A position plotting mechanism comprising a plurality of arm members intersecting at a common point and pivotally connected together at said point, said members being separately pivoted at points corresponding to the map positions of respective reference stations, and means connected to each of said arms for adjusting the distance along said arm between said common pivot point and said respective reference pivot point to such a value that the differences between said distances corresponds to the differences between the distances from said mobile station to said reference stations.

4. The invention as claimed in claim 2, including means for positioning said common pivot point along each of said arm members, said means comprising a distance measuring device, a motor controlled by the output of said device, and a mechanical connection from said motor to the pivot positioning means of said arm member.

5. The invention as claimed in claim 3, including differential gearing interconnecting each pair of pivot adjusting means.

6. The invention as claimed in claim 2, wherein each of said arm members comprises a form stiffened tape.

7. A position plotting system including means for deriving a plurality of synchronized wave trains, differing from each other in phase according to the differences in the distances of a plurality of reference stations from a mobile station, phase difference responsive means arranged to compare the phase of one of said wave trains with the phase of each of the others of said wave trains, motors controlled by the outputs of said phase difference responsive means, mechanical connections from each of said motors through differential gearing to a phase shifter included in one of the input circuits of the phase difference responsive device controlling the respective motor, a mechanical connection between said differentials, a plurality of arm members intersecting at a common point and pivotally connected together at said point, means on each of said arm members for adjusting said common pivot point longitudinally thereof, mechanical connections from each of said motors to one of said pivot adjusting means, and a mechanical connection from said connection between said differentials to one of said pivot adjusting means.

8. The invention as claimed in claim 2, including means for positioning said common pivot point along each of said arm members, said means comprising a distance measuring device, a motor mechanically connected to the pivot positioning means of said arm member, and means for controlling said motor in response to said distance measuring device and said pivot positioning means, whereby said pivot is moved to a point corresponding to the output of said distance measuring device.

9. A position plotting system including means for deriving sequentially a plurality of voltages respectively proportional in magnitude to the distances of a plurality of reference stations from a mobile station; relay means arranged to respond successively to said sequential voltages, a motor connected to be energized through said relay means, a plurality of voltage control devices connected to said motor through clutches so as to be successively controlled by said motor in accordance with said distance proportional voltages respectively, a plurality of arm members intersecting at a common point and pivotally connected together at said point, means on each of said arm members for adjusting said common pivot point longitudinally thereof, mechanical connections from said pivot adjusting means through said clutches respectively to said motor.

10. The invention as claimed in claim 2, wherein each of said means for adjusting said pivot point includes a motor mounted on said arm member, a resistor element mounted on and extending along said arm member, a differential relay connected to control said motor, means for applying a voltage proportional to said distance from said mobile station to said fixed station to one input circuit of said relay, a source of electrical energy connected through said resistor to the other input circuit of said relay and a contact arrangned to engage said resistor element and mechanically connected to said motor so as to be moved longitudinally of said arm member upon rotation of said motor.

DAVID G. C. LUCK.

REFERENCES CITED

The following references are of record in the file of this patent:

UNITED STATES PATENTS

| Number | Name | Date |
|---|---|---|
| 2,171,561 | Hooven | Sept. 5, 1939 |